United States Patent [19]

Spadafora

[11] 3,813,542
[45] May 28, 1974

[54] BRAKE SIGNAL DEVICE FOR A VEHICLE
[76] Inventor: Joe Spadafora, 65 Forest Manor Rd., No. 502, Willowdale, Ontario, Canada
[22] Filed: Sept. 7, 1972
[21] Appl. No.: 287,008

[52] U.S. Cl.................... 250/221, 250/215, 315/82
[51] Int. Cl. ............................................ G01p 3/68
[58] Field of Search.................... 250/221, 222, 215; 340/220; 315/76, 77, 82, 159, 155

[56] References Cited
UNITED STATES PATENTS
| 2,039,604 | 5/1936 | Miller et al. | 250/221 X |
| 2,683,602 | 7/1954 | Dumas et al. | 250/271 X |
| 3,328,592 | 6/1967 | Shaw | 250/221 |
| 3,382,405 | 5/1968 | Johnson | 315/77 X |
| 3,514,623 | 5/1970 | Ballard | 315/80 X |
| 3,670,167 | 6/1972 | Forbes | 250/221 |

Primary Examiner—Walter Stolwein
Attorney, Agent, or Firm—Lane, Aitken, Dunner & Ziems

[57] ABSTRACT

A brake signal device for a vehicle in which a beam of light is directed with respect to the brake pedal of the vehicle in a manner so that it is interrupted when the vehicle operator moves his foot to a position engaging the pedal. An electrical circuit including a photocell is responsive to the interruption of the beam for energizing a brake signal light normally mounted at the rear of the vehicle.

5 Claims, 2 Drawing Figures

PATENTED MAY 28 1974 3,813,542
FIG.1.
FIG.2.
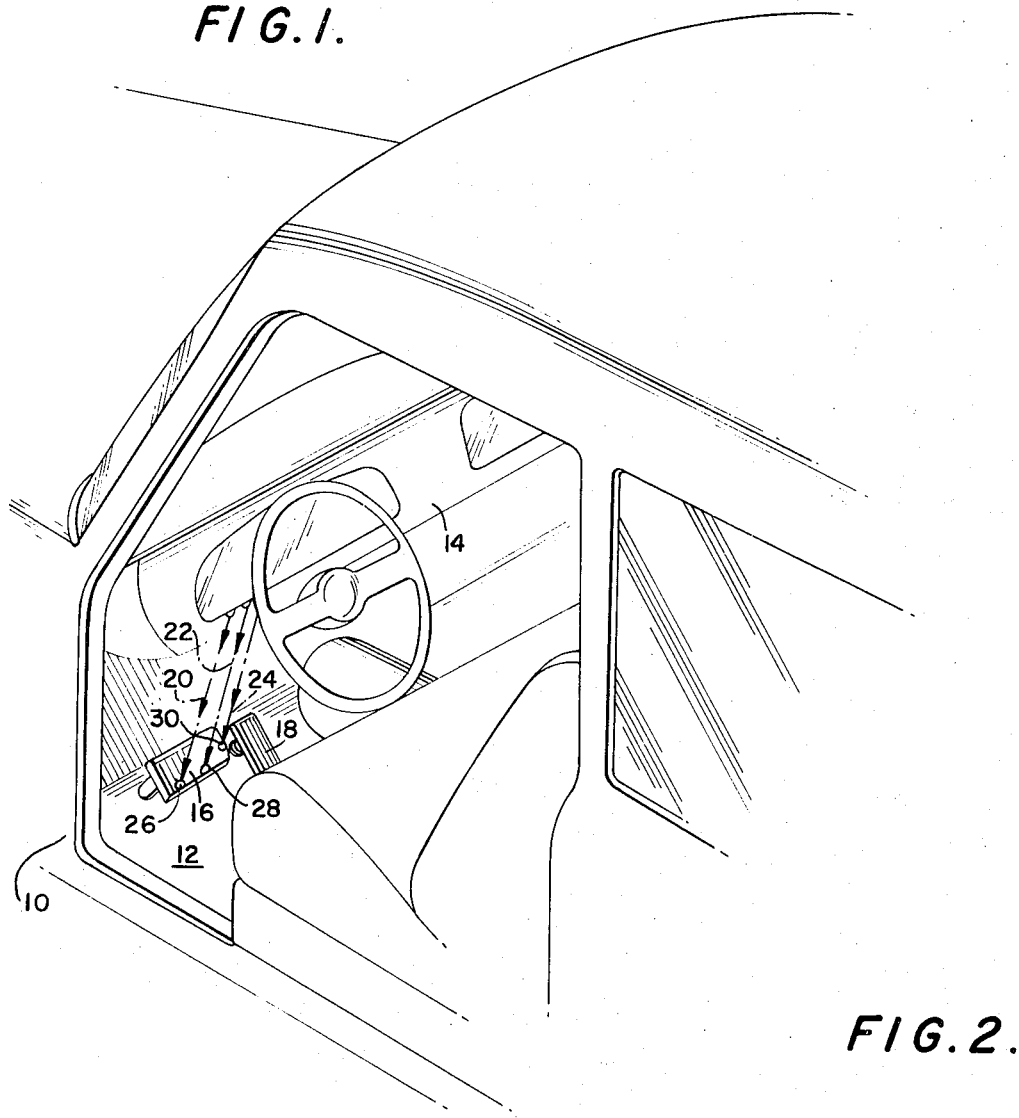
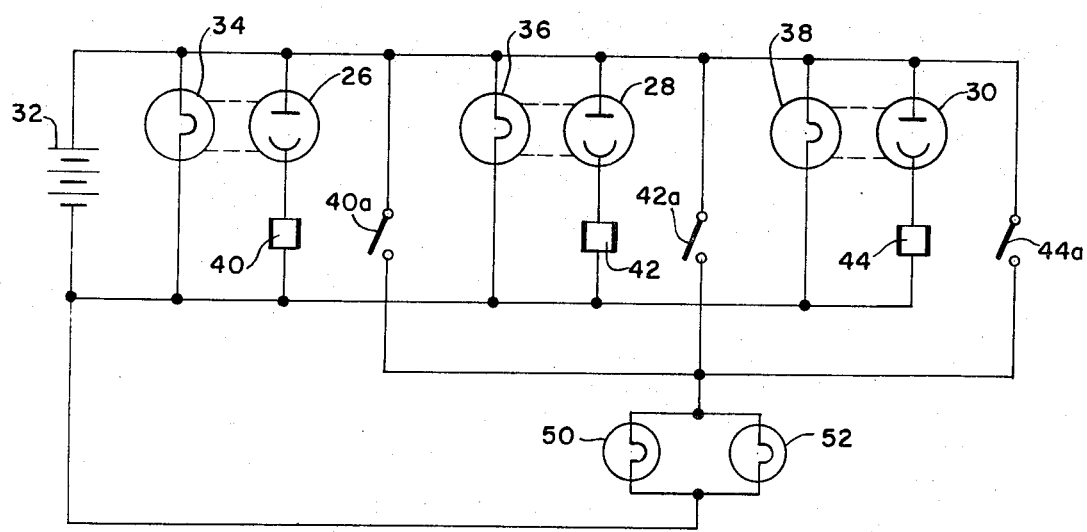

BRAKE SIGNAL DEVICE FOR A VEHICLE

BACKGROUND OF THE INVENTION

This invention relates to a signal device for a vehicle, and more particularly, to a device for energizing a rear brake light by the operator of a vehicle.

Nearly all vehicles in use today are provided with a rear brake light, or lights, which is energized in response to the operator of the vehicle depressing the brake pedal with his foot. In most arrangements, a predetermined movement of the pedal is required in order to close a switch which, in turn, energizes the rear brake light. However, these type systems give relatively little advance warning to vehicles approaching from the rear, especially under high speed driving conditions.

Of course, this is conducive to rear end collisions, especially under crowded road conditions.

SUMMARY OF THE INVENTION

It is, therefore, an object of the present invention to provide an improved brake signal device which gives the driver of a trailing vehicle a relatively early warning that the vehicle immediately in front of him will be slowing down or stopping.

Toward the fulfillment of this and other objects, the device of the present invention comprises at least one light source adapted for mounting on the vehicle frame for producing a light beam directed relative to the brake pedal of the vehicle in a manner so that the beam is interrupted on movement of the vehicle operator's foot from a relaxed position to a position engaging said pedal, and electrical circuit means for energizing a normally de-energized signal light mounted on said vehicle in response to said interruption of said beam.

BRIEF DESCRIPTION OF THE DRAWINGS

FIG. 1 is a cutaway, perspective view of a portion of the interior of a vehicle incorporating the brake signal device of the present invention; and FIG. 2 is a circuit diagram of the circuit utilized in the device of the present invention.

DESCRIPTION OF THE PREFERRED EMBODIMENT

The reference numeral 10 refers in general to a vehicle frame which includes a floor 12 and a dashboard 14. A brake pedal 16 and an accelerator 18 are movably mounted relative to the floor 12 in a conventional manner.

Three light beams 20, 22, and 24 from three corresponding sources of light 25 mounted underneath the dashboard 14 are directed toward the brake pedal 16. Three corresponding photocells 26, 28, and 30 are mounted on the brake pedal 16 and in the paths of the light beams 20, 22, and 24, respectively, with the photocells preferably being mounted flush with the upper surface of the pedal.

It is apparent that upon movement of the operator's foot from a relaxed position, such as from a position in engagement with accelerator 18, towards the brake pedal 16 the foot will interrupt one or more of the light beams 20, 22, and 24.

Referring to FIG. 2, which depicts the electrical circuit employed in the present invention, the photocells 26, 28, and 30 are shown arranged in parallel in a circuit including the vehicle battery 32 and the light sources 25, respectively for energizing the photocells. Three relays 40, 42, and 44 are connected in the circuit as shown with the relays including switches 40a, 42a, and 44a, respectively, which are biased to a closed position but which are maintained in the open position shown by means of the coil portions of the relays when the latter receives sufficient current, in a conventional manner.

A pair of brake lights 50 and 52, which are normally mounted on the rear portion of the vehicle frame in a conventional manner so that they may be visible externally of the vehicle, are connected to the battery 32 and to the switches 40a, 42a, and 44a in a manner so that upon closing of any one of the switches, the lights will be energized.

It is understood that the circuit depicted in FIG. 2 is a basic circuit only and may be provided with resistors, amplifiers, etc., as needed in accordance with conventional circuit design.

In operation, the lights 25 are energized by the battery 32 upon the vehicle ignition switch beng turned on, to cause the beams 20, 22, and 24 to be directed towards their respective photocells 26, 28, and 30. Upon the operator's foot interrupting one or more of the beams 20, 22, and 24, the electrical resistance is increased causing a corresponding decrease in current to the respective relay or relays, which, in turn, causes its corresponding switch 40a, 42a, or 44a to close and the brake lights 52 and 54 to be energized.

It is apparent that according to the device of the present invention, the brake lights will be energized a finite time earlier than they would if connected to the brake pedal in accordance with conventional arrangements. It has been determined that as much as a one-half second advance of the energizing of the brake lights 52 and 54 can be effected in accordance with the present invention which, for vehicles traveling at approximately 70 mph, will give the driver of the car immediately to the rear of the vehicle incorporating the device of the present invention an additional 50 feet in which to stop. Thus, in accordance with the present invention many tail end collisions will be avoided and the momentum on impact of the collisions that do occur will be greatly diminished.

The device of the present invention may be utilized to the exclusion of the conventional brake signal light actuating apparatus discussed above or may be used in addition thereto. In the latter case, the conventional apparatus could be used in a redundant, fail-safe capacity.

Of course, several variations may be made in the foregoing without departing from the scope of the invention. For example, the specific number and location of the light sources and/or the photocells may be varied in accordance with the particular design requirements.

Of course, other variations of the specific construction and arrangement of the brake signal device disclosed above can be made by those skilled in the art without departing from the invention as defined in the appended claims.

I claim:

1. A signal device for a vehicle having a driver-operated accelerator pedal and brake pedal mounted proximate to the floor of said vehicle, with the brake pedal being mounted in a spaced relation to said accelerator pedal in a manner so that the operator's foot travels in a path from said accelerator pedal to a position above said brake pedal and downwardly towards said brake pedal to actuate the vehicle brakes, said device comprising at least one light producing means mounted on the vehicle frame for producing at least one light beam directed across said path so that the beam is interrupted on movement of the operator's foot in said path and before contact with said brake pedal, and light-sensitive means mounted proximate to said brake pedal for energizing a normally de-eneragized signal light mounted on said vehicle in response to said interruption of said beam.

2. The device of claim 1 wherein said light-sensitive means comprises an electrical circuit for selectively connecting said normally de-energized light to the vehicle battery, and a photocell connected in said circuit and adapted for mounting in the path of said light beam for changing the electrical characteristics of said circuit in response to said interruption.

3. The device of claim 2 wherein said electrical circuit also includes a relay for connecting said normally de-energized light to said battery in response to said change in the electrical characteristics of said circuit.

4. The device of claim 2 wherein said photocell is adapted for mounting on said brake pedal.

5. The device of claim 1 wherein said light-producing means is adapted for mounting underneath the dashboard of said vehicle.

* * * * *